(12) United States Patent
Lee et al.

(10) Patent No.: US 8,817,737 B2
(45) Date of Patent: *Aug. 26, 2014

(54) METHOD OF TRANSMITTING AND RECEIVING DATA IN A MOBILE COMMUNICATION NETWORK

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 496 days.

This patent is subject to a terminal disclaimer.

(21) Appl. No.: 12/092,060

(22) PCT Filed: Oct. 27, 2006

(86) PCT No.: PCT/KR2006/004416
§ 371 (c)(1),
(2), (4) Date: Apr. 29, 2008

(87) PCT Pub. No.: WO2007/052921
PCT Pub. Date: May 10, 2007

(65) Prior Publication Data
US 2008/0298319 A1    Dec. 4, 2008

Related U.S. Application Data

(60) Provisional application No. 60/732,080, filed on Oct. 31, 2005.

(30) Foreign Application Priority Data

Jul. 5, 2006 (KR) .................. 10-2006-0063139

(51) Int. Cl.
*H04L 12/28* (2006.01)
*H04L 5/00* (2006.01)
*H04W 28/06* (2009.01)
*H04W 72/14* (2009.01)

(52) U.S. Cl.
CPC ............. *H04W 28/06* (2013.01); *H04L 5/0051* (2013.01); *H04L 5/005* (2013.01); *H04W 72/14* (2013.01); *H04L 5/0007* (2013.01); *H04L 5/0053* (2013.01)
USPC ......... 370/330; 370/395.4; 370/468; 370/478

(58) Field of Classification Search
None
See application file for complete search history.

(56) References Cited

U.S. PATENT DOCUMENTS 5,404,355 A    4/1995   Raith
5,697,055 A    12/1997  Gilhousen et al.

(Continued)

FOREIGN PATENT DOCUMENTS

CN    1371576    9/2002
CN    1505912    6/2004

(Continued)

OTHER PUBLICATIONS

Seizo Onoe, Jun Tajima, Takanori Utano and Narumi Umeda; Control Channel Structure for TDMA Mobile Radio Systems; NTT Radio Communication Systems Laboratories 1-2356, Take, Yokosuka, 238, Japan, 1990.

(Continued)

*Primary Examiner* — Christine Duong
(74) *Attorney, Agent, or Firm* — Lee, Hong, Degerman, Kang & Waimey

(57) ABSTRACT

A method of receiving control information by a terminal in a mobile communications system having a single control channel and a plurality of common channels and having a network that periodically transmits the control information via the control channel, the method comprising: periodically receiving the control channel; detecting, at a particular time, an identifier from the received control channel; and receiving data via a particular common channel that is indicated by control information that includes the detected identifier.

16 Claims, 2 Drawing Sheets

(56) References Cited

U.S. PATENT DOCUMENTS

| | | | |
|---|---|---|---|
| 6,359,867 | B1 | 3/2002 | Ali-Vehmas |
| 6,532,225 | B1 | 3/2003 | Chang et al. |
| 6,563,807 | B1 | 5/2003 | Kim et al. |
| 6,628,946 | B1* | 9/2003 | Wiberg et al. ............... 455/434 |
| 6,845,238 | B1 | 1/2005 | Muller |
| 6,920,155 | B2 | 7/2005 | Rao |
| 6,968,192 | B2 | 11/2005 | Longoni |
| 7,123,910 | B2 | 10/2006 | Lucidarme et al. |
| 7,430,420 | B2 | 9/2008 | Derakhshan et al. |
| 7,471,948 | B2 | 12/2008 | Farnsworth et al. |
| 7,535,846 | B2 | 5/2009 | Kim et al. |
| 7,551,937 | B2* | 6/2009 | Kim et al. ..................... 455/509 |
| 7,809,373 | B2 | 10/2010 | Park et al. |
| 7,983,676 | B2 | 7/2011 | Ju et al. |
| 8,134,974 | B2 | 3/2012 | Chun et al. |
| 8,406,767 | B2 | 3/2013 | Chun et al. |
| 2001/0016496 | A1 | 8/2001 | Lee |
| 2001/0026543 | A1 | 10/2001 | Hwang et al. |
| 2001/0030956 | A1 | 10/2001 | Chillariga et al. |
| 2001/0036113 | A1 | 11/2001 | Jurgensen et al. |
| 2002/0045448 | A1 | 4/2002 | Park et al. |
| 2002/0048266 | A1 | 4/2002 | Choi et al. |
| 2002/0051431 | A1 | 5/2002 | Choi et al. |
| 2002/0052206 | A1 | 5/2002 | Longoni |
| 2002/0071480 | A1 | 6/2002 | Marjelund et al. |
| 2002/0085516 | A1 | 7/2002 | Bridgelall |
| 2002/0122393 | A1 | 9/2002 | Caldwell et al. |
| 2002/0159412 | A1 | 10/2002 | Odenwalder et al. |
| 2002/0181436 | A1 | 12/2002 | Mueckenheim et al. |
| 2003/0002472 | A1* | 1/2003 | Choi et al. .................... 370/347 |
| 2003/0026324 | A1 | 2/2003 | Li et al. |
| 2003/0035440 | A1 | 2/2003 | Casaccia et al. |
| 2003/0053344 | A1 | 3/2003 | Herrmann |
| 2003/0054829 | A1 | 3/2003 | Moisio |
| 2003/0076812 | A1 | 4/2003 | Benedittis |
| 2003/0095552 | A1 | 5/2003 | Bernhard et al. |
| 2003/0131300 | A1 | 7/2003 | Park et al. |
| 2003/0202489 | A1 | 10/2003 | Lee |
| 2003/0207696 | A1 | 11/2003 | Willenegger et al. |
| 2004/0009767 | A1* | 1/2004 | Lee et al. ..................... 455/422.1 |
| 2004/0022217 | A1 | 2/2004 | Korpela et al. |
| 2004/0029532 | A1 | 2/2004 | Schwarz et al. |
| 2004/0053614 | A1 | 3/2004 | Il-Gyu et al. |
| 2004/0085926 | A1 | 5/2004 | Hwang et al. |
| 2004/0103435 | A1 | 5/2004 | Yi et al. |
| 2004/0114574 | A1 | 6/2004 | Zeira et al. |
| 2004/0127244 | A1* | 7/2004 | Matsumoto et al. ........... 455/517 |
| 2004/0152478 | A1* | 8/2004 | Ruohonen et al. ............. 455/502 |
| 2004/0162072 | A1 | 8/2004 | Sigle et al. |
| 2004/0171401 | A1 | 9/2004 | Balachandran et al. |
| 2004/0185852 | A1 | 9/2004 | Son et al. |
| 2005/0059437 | A1 | 3/2005 | Son et al. |
| 2005/0094586 | A1 | 5/2005 | Zhang et al. |
| 2005/0105488 | A1 | 5/2005 | Raji et al. |
| 2005/0105505 | A1 | 5/2005 | Fishler et al. |
| 2005/0107105 | A1* | 5/2005 | Wakabayashi ................ 455/515 |
| 2005/0119004 | A1 | 6/2005 | Gao et al. |
| 2005/0138528 | A1 | 6/2005 | Ameigeiras et al. |
| 2005/0153700 | A1 | 7/2005 | Farnsworth et al. |
| 2005/0159161 | A1 | 7/2005 | Florkey et al. |
| 2005/0177623 | A1 | 8/2005 | Roberts et al. |
| 2005/0181801 | A1 | 8/2005 | Funnell |
| 2005/0197132 | A1 | 9/2005 | Lee et al. |
| 2005/0227691 | A1 | 10/2005 | Pecen et al. |
| 2005/0271025 | A1 | 12/2005 | Guethaus et al. |
| 2005/0282547 | A1 | 12/2005 | Kim et al. |
| 2006/0039327 | A1 | 2/2006 | Samuel et al. |
| 2006/0056355 | A1 | 3/2006 | Love et al. |
| 2007/0010268 | A1 | 1/2007 | Kim et al. |
| 2007/0032255 | A1 | 2/2007 | Koo |
| 2007/0049344 | A1* | 3/2007 | Van Der Velde et al. ...... 455/560 |
| 2007/0117563 | A1 | 5/2007 | Terry et al. |
| 2007/0133458 | A1* | 6/2007 | Chandra et al. ............... 370/329 |
| 2007/0147315 | A1 | 6/2007 | Khoury et al. |
| 2007/0155388 | A1 | 7/2007 | Petrovic et al. |
| 2008/0062905 | A1 | 3/2008 | Goldberg et al. |
| 2008/0123585 | A1 | 5/2008 | Granzow et al. |
| 2008/0254800 | A1 | 10/2008 | Chun et al. |
| 2008/0268852 | A1 | 10/2008 | Petrovic et al. |
| 2009/0207810 | A1 | 8/2009 | Petrovic et al. |

FOREIGN PATENT DOCUMENTS

| | | |
|---|---|---|
| CN | 1567769 A | 1/2005 |
| EP | 0939569 | 9/1999 |
| EP | 1220490 | 7/2002 |
| EP | 1326460 | 7/2003 |
| EP | 1505782 | 2/2005 |
| EP | 1519519 | 3/2005 |
| EP | 1553798 | 7/2005 |
| EP | 1565026 | 8/2005 |
| GB | 2332340 | 12/1997 |
| JP | 09-186704 | 7/1997 |
| JP | 10-136426 | 5/1998 |
| JP | 11-146462 | 5/1999 |
| JP | 11-196477 | 7/1999 |
| JP | 11-341541 | 12/1999 |
| JP | 2000-069531 | 3/2000 |
| JP | 2001-078246 | 3/2001 |
| JP | 2001-313968 | 11/2001 |
| JP | 2003-500950 | 1/2003 |
| JP | 2003-087842 | 3/2003 |
| JP | 2003-111148 | 4/2003 |
| JP | 2003102055 | 4/2003 |
| JP | 2003-152600 | 5/2003 |
| JP | 2003523687 | 8/2003 |
| JP | 2003324761 | 11/2003 |
| JP | 2004-135287 | 4/2004 |
| JP | 2004-208177 | 7/2004 |
| JP | 2004-221760 | 8/2004 |
| JP | 2004-289234 | 10/2004 |
| JP | 2005509313 | 4/2005 |
| JP | 2005-124215 | 5/2005 |
| JP | 2005513907 | 5/2005 |
| JP | 2005-525065 | 8/2005 |
| JP | 2005-237031 | 9/2005 |
| JP | 2005-260337 | 9/2005 |
| JP | 2005-277570 | 10/2005 |
| JP | 2006-507753 | 3/2006 |
| JP | 2007-502557 | 2/2007 |
| KR | 10-2003-0007481 | 1/2003 |
| KR | 10-2003-0056143 | 7/2003 |
| KR | 1020030080946 | 10/2003 |
| KR | 1020040025491 | 3/2004 |
| KR | 1020040040723 | 5/2004 |
| KR | 10-2005-0032285 | 4/2005 |
| KR | 1020050032949 | 4/2005 |
| KR | 10-2005-0078635 | 8/2005 |
| KR | 10-2005-0084908 | 8/2005 |
| KR | 1020050078636 | 8/2005 |
| KR | 10-0688303 | 3/2007 |
| RU | 2145774 | 2/2000 |
| RU | 2149518 | 5/2000 |
| RU | 2216100 | 11/2003 |
| RU | 2237287 | 9/2004 |
| RU | 2238585 | 10/2004 |
| TW | 583884 | 4/2004 |
| TW | I236241 | 7/2005 |
| WO | 00/72609 | 11/2000 |
| WO | 00/74420 | 12/2000 |
| WO | 01/05121 | 1/2001 |
| WO | 01/35586 | 5/2001 |
| WO | 02/09825 | 2/2002 |
| WO | 0241509 | 5/2002 |
| WO | 03/017544 | 2/2003 |
| WO | 03017544 | 2/2003 |
| WO | 03/088691 | 10/2003 |
| WO | 03/096149 | 11/2003 |
| WO | 03-096731 | 11/2003 |
| WO | 03-103320 | 12/2003 |
| WO | 2004/016016 | 2/2004 |
| WO | 2004/017541 | 2/2004 |
| WO | 2004016007 | 2/2004 |
| WO | 2004/089013 | 10/2004 |

(56) References Cited

FOREIGN PATENT DOCUMENTS

| WO | 2005-011134 | 2/2005 |
|---|---|---|
| WO | 2005/018255 | 2/2005 |
| WO | 2005/060132 | 6/2005 |
| WO | 2005/072073 | 8/2005 |
| WO | 2005/078966 | 8/2005 |
| WO | 2005-083912 | 9/2005 |
| WO | 2005/089002 | 9/2005 |

OTHER PUBLICATIONS

Onoe, et al., "Control Channel Structure for TDMA Mobile Radio Systems," 40th IEEE Vehicular Technology Conference, May 6, 1990, pp. 270-275.

NTT DoCoMo, et al, "Multiplexing Method of Shared Control Channel in Uplink Single-Carrier FDMA Radio Access," TSG-RAN WG1#42bis, R1-051143, Oct. 10, 2005.

LG Electronics, "Functions of E-RRC and E-MAC," TSG-RAN Working Group 2 #48bis, R2-052768, Oct. 10, 2005.

3rd Generation Partnership Project (3GPP); "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7 .0.0, Jun. 2006.

Nokia, "Intra-radio access mobility, Handover in LTE_ACTIVE", R2-060053, 3GPP TSG-RAN WG2#50, Jan. 2006.

Nokia et al., "Intra_LTE Handover Operation", R2-061135, 3GPP TSG-RAN WG2 Meeting#53, May 2006.

NTT DoCoMo et al., "Physical Channels and Multiplexing in Evolved UTRA Downlink", R1-050707, 3GPP TSG RAN WG1 #42 on LTE, Aug. 2005.

NTT DoCoMo, "Physical Channel Structures for Evolved UTRA", R1-050464, 3GPP TSG RAN WG1 Meeting #41, May 2005.

Nokia et al., "E-UTRA Transport Channels", R2-052438, 3GPP TSG-RAN WG2 Meeting#48bis, Oct. 2005.

InterDigital Communication, "Intra-LTE Handover—Context Transfer and Data forwarding," R3-060751, 3GPP TSG RAN3 #52, May 2006, XP50159655, 11 pages.

Siemens, "SDU Forwarding During Intra-LTE Hand-Over," R3-060775, 3GPP TSG RAN WG3 Meeting #52, Apr. 2006, XP50159678, 3 pages.

European Patent Office Application Serial No. 06812263.9, Office Action dated Feb. 26, 2013, 8 pages.

The State Intellectual Property Office of the People's Republic of China Application Serial No. 200680040353.8, Office Action dated Jan. 5, 2013, 6 pages.

U.S. Appl. No. 13/487,081, Notice of Allowance dated Jan. 4, 2013, 11 pages.

IEEE Standard, "Part 16: Air Interface for Fixed Broadband Wireless Access Systems," IEEE Std 802.16, Oct. 2004.

NTT DoCoMo, Inc. et al., "System Information Structure in LTE", R2-062162, 3GPP TSG-RAN WG2 #54, Aug. 2006, XP002465834.

Nokia, "On the DL frequency resource block dimensioning", R1-051091, 3GPP TSG RAN WG1 Meeting #42bis, Oct. 2005, XP050100706.

LG Electronics, "Downlink Channels and Mapping for Evolved UTRA", R2-052393, TSG-RAN Working Group 2 #48bis, Oct. 2005, XP050129506.

European Patent Office Application Serial No. 06812212.6, Search Report dated Aug. 20, 2013, 5 pages.

3rd Generation Partnership Project (3GPP), "Technical Specification Group Radio Access Network; Radio Resource Control (RRC); Protocol Specification (Release 6)," 3GPP TS 25.331 V6.7.0, Sep. 2005, 1167 pages.

Samsung, "Downlink Signaling requirement for MBMS," 3GPP TSG-RAN WG2 meeting #30, R2-021670, Jun. 2002, 3 pages.

InterDigital Communication, "Intra-LTE Handover—Context Transfer and Data forwarding," 3GPP TSG RAN3 #52, R3-060751, May 2006, 11 pages.

European Patent Office Application Serial No. 13002307.0, Search Report dated Aug. 14, 2013, 7 pages.

Intellectual Property Office of India Application Serial No. 1326/KOLNP/2008, Office Action dated Jul. 30, 2013, 1 page.

Intellectual Property Office of India Application Serial No. 1373/KOLNP/2008, Office Action dated Jul. 22, 2013, 2 pages.

Qualcomm Europe, "L2 Buffer Management at E-UTRAN Cell Change", R2-052475, 3GPP TSG-RAN WG2 meeting #48bis, Oct. 2005, XP-002670656.

NEC et al., "EUTRAN handover procedure for LTE_ACTIVE", R3-051106, Joint RAN2-RAN3 #48bis LTE, Oct. 2005, XP-050158616.

Draft Amendment to IEEE Standard for Local and metropolitan area networks, "Part 16: Air Interface for Fixed and Mobile Broadband Wireless Access Systems; Amendment for Physical and Medium Access Control Layers for Combined Fixed and Mobile Operation in Licensed Bands", IEEE P802.16e/D12, Oct. 2005, XP-002670655.

U.S. Appl. No. 12/092,055, Office Action dated Jan. 30, 2014, 16 pages.

Japan Patent Office Application Serial No. 2012-179500, Office Action dated Nov. 26, 2013, 4 pages.

\* cited by examiner

METHOD OF TRANSMITTING AND RECEIVING DATA IN A MOBILE COMMUNICATION NETWORK

CROSS-REFERENCE TO RELATED APPLICATIONS

This application is the National Stage filing under 35 U.S.C. 371 of International Application No. PCT/KR2006/004416, filed on Oct. 27, 2006, which claims the benefit of earlier filing date and right of priority to Korean Patent Application No. 10-2006-0063139, filed on Jul. 5, 2006, and also claims the benefit of U.S. Provisional Patent Application No. 60/732,080, filed on Oct. 31, 2005.

TECHNICAL FIELD

The present invention relates to a E-UMTS (Evolved Universal Mobile Telecommunications System), and in particular, relates to a data receiving method for a mobile terminal.

BACKGROUND ART

To support broadband wireless (e.g., WiMAX) access, there are different types of broadband wireless air interfaces, such as cellular 3G technologies (e.g., UMTS, WCDMA, etc.), and multi-carrier based multiple access techniques (e.g., OFDMA, OFDM-TDMA, OFDM-CDMA, etc.). Frequency division multiplexing involves sub-channelization, of which at least four types (OFDM, Flash OFDM, sOFDMA and OFDMA) exist.

Orthogonal Frequency Division Multiplexing (OFDM) involves the splitting of a radio signal into multiple smaller sub-signals that are then transmitted simultaneously at different frequencies to a receiver. OFDM refers to a form of multi-carrier transmission where all the sub-carriers are orthogonal to each other. Certain IEEE standards and 3GPP standards are related to various aspects of OFDM.

FIGS. 1 and 2 show a typical frame that is used in OFDM. One frame has a time duration of 10 ms (milliseconds) and consists of 20 sub-frames, each having a time duration of 0.5 ms. Each sub-frame may consist of a resource block (RB) that contains data or information, and a cyclic prefix (CP) that is a guard interval needed for conventional OFDM modulation (but not needed for OFDM with pulse shaping, i.e., OFDM/OQAM). The sub-frame duration corresponds to the minimum downlink TTI (Transmission Time Interval).

FIG. 3 shows a basic downlink reference-signal structure consisting of known reference symbols. Namely, a mapping of physical channel symbols in frequency domain is shown. In other words, channel-coded, interleaved, and data-modulated information (i.e., Layer 3 information) is mapped onto OFDM time/frequency symbols. The OFDM symbols can be organized into a number (M) of consecutive sub-carriers for a number (N) of consecutive OFDM symbols.

Here, it is assumed that 7 OFDM symbols exist per sub-frame (when the CP length is short). In case of a long CP or a different frame structure, this basic downlink reference-signal structure would be slightly different.

Reference symbols (i.e., first reference symbols) are located in the first OFDM symbol of every sub-frame assigned for downlink transmission. This is valid for both FDD and TDD, as well as for both long and short CP. Additional reference symbols (i.e., second reference symbols) are located in the third last OFDM symbol of every sub-frame assigned for downlink transmission. This is the baseline for both FDD and TDD, as well as for both long and short CP. However, for FDD, an evaluation of whether the second reference symbols are need should be made.

FIG. 4 shows an exemplary network architecture of a E-UMTS (Evolved Universal Mobile Telecommunications System) applicable to the present invention.

The E-UMTS system is a system that has evolved from the UMTS system, and its standardization work is currently being performed by the 3GPP standards organization.

As shown in FIG. 4, the E-UMTS network is generally comprised of a E-UTRAN and a core network (CN). The E-UTRAN is comprised of a terminal (i.e., user equipment: UE) and a base station (i.e., eNode B or eNB), as well as an access gateway (AG) that is located at an end of the E-UMTS network and connects with one or more external networks. The AG can be divided into a portion that handles user traffic and a portion that handles control traffic. In such case, the AG that handles user traffic and the AG that handles control traffic can communicate with each other via a newly defined interface. For one eNode B, one or more cells may exist. Between the eNode Bs, an interface for transmitting user traffic and control traffic may be employed. The core network (CN) may be comprised of nodes and the like that are used for registration and other functions for users of the UEs and the AG. Also, an interface for distinguishing the E-UTRAN and the CN may be employed.

Also, in the E-UMTS network, there may be a control plane server (CPS) that performs radio (wireless) control functions, a radio resource management (RRM) entity that performs radio resource management functions, a mobility management entity (MME) that performs mobility management functions for a mobile terminal. Here, it can be understood that the particular names of the various network entities are not limited to those mentioned above.

FIG. 5 shows an exemplary architecture (structure) of a radio interface protocol between a terminal (UE) and a UTRAN (UMTS Terrestrial Radio Access Network) that is based upon a 3GPP radio access network standard. The radio interface protocol of FIG. 5 is horizontally comprised of a physical layer, a data link layer, and a network layer, and vertically comprised of a user plane for transmitting user data and a control plane for transferring control signaling. The radio interface protocol layer of FIG. 5 may be divided into L1 (Layer 1), L2 (Layer 2), and L3 (Layer 3) based upon the lower three layers of the Open System Interconnection (OSI) standards model that is known the field of communication systems.

The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The physical channel is modulated by OFDM (Orthogonal Frequency Division Multiplexing) techniques, employing time and frequency as radio resources.

The MAC layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself might not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

The NAS (Non-Access Stratum) layer located at a higher level than the RRC layer performs the functions of session management, mobility management, and the like.

As for channels used in downlink transmission for transmitting data from the network to the mobile terminal, there is a broadcast channel (BCH) used for transmitting system information, and a shared channel (SCH) used for transmitting user traffic or control messages. Accordingly, traffic for a downlink multicast or broadcast service, or a control message may be transmitted via a downlink SCH, or may be transmitted via a separate (distinct) downlink MCH (multicast channel).

Also, as for channels used in uplink transmission for transmitting data from the mobile terminal to the network, there is a random access channel (RACH) used for transmitting an initial control message, and a shared channel (SCH) used for transmitting user traffic or control messages.

Additionally, as for logical channels that are located at a higher level than the transport channels and that are mapped to the transport channels, a BCCH (Broadcast Channel), PCCH (Paging Control Channel), CCCH (Common Control Channel), MCCH (Multicast Control Channel), MTCH (Multicast Traffic Channel), and the like exist.

DISCLOSURE OF INVENTION

Technical Problem

In the related art, the SCCH (Shared Control Channel), which is a channel that transmits control information of the SCH channel, always transports a mobile terminal (UE) identifier for identifying mobile terminals. Accordingly, when data of a common channel for multiple mobile terminals is transmitted by the SCH channel, the SCCH must transmit a plurality of mobile terminal identifiers to be used by multiple mobile terminals. As such, the large size (or amount) of control information that is transmitted by the SCCH is problematic.

Also, in the related art, the mobile terminal should receive the SCH channel at each and every frame. However, because the data that should be read by the mobile terminal (i.e., the data for that ULE itself) is actually transmitted only at particular frames, the reception of the SCH channel for each frame unnecessarily wastes battery power.

Technical Solution

The present invention has been developed in order to solve the above described problems of the related art. As a result, the present invention provides a data receiving method for a mobile terminal that can minimize the size (or amount) of data generated in the data transmitting and receiving process, and that can minimize the waste of battery power of the mobile terminal.

MODE FOR THE INVENTION

Figure 1:
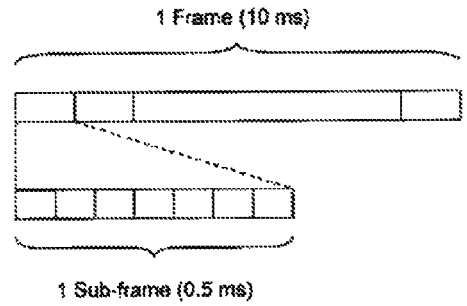
FIG. 1 shows an exemplary structure of one frame used in OFDM.
Figure 2:
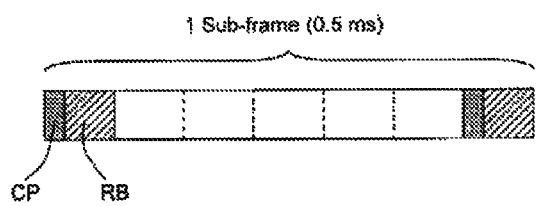
FIG. 2 shows an exemplary structure of one sub-frame within the frame of FIG. 1.
Figure 3:
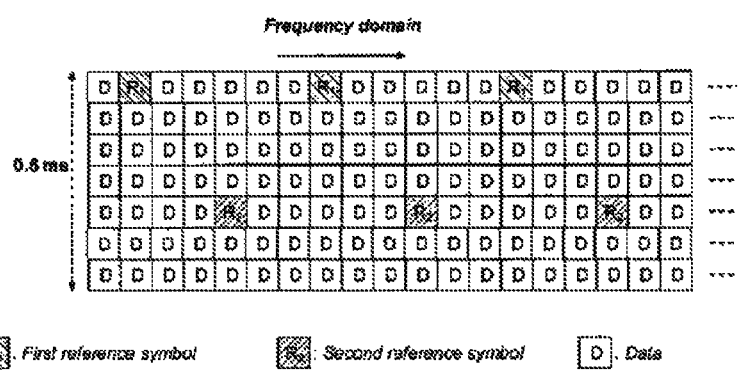
FIG. 3 shows an example of how data and reference symbols for OFDM may be expressed in the frequency domain and the time domain.
Figure 4:
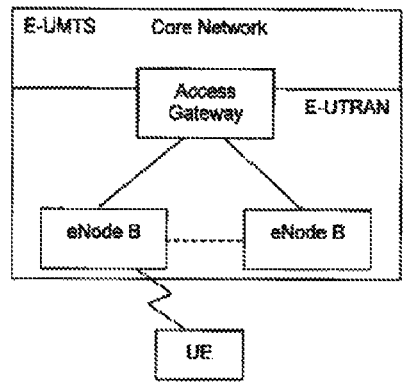
FIG. 4 shows an exemplary architecture (structure) of a E-UMTS network.
Figure 5:
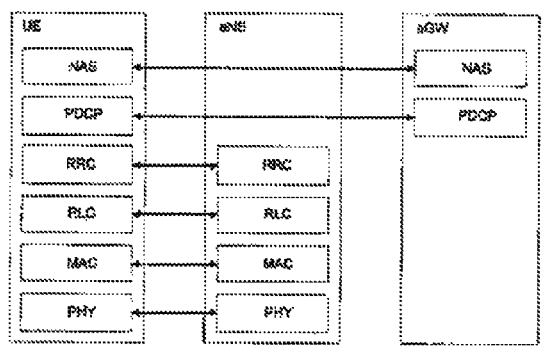
FIG. 5 shows an exemplary radio (wireless) interface protocol architecture between a UE and a UTRAN based upon a 3GPP radio access network standard.

One aspect of the present invention is the recognition by the present inventors regarding the problems and drawbacks of the related art described above and explained in more detail hereafter. Based upon such recognition, the features of the present invention have been developed.

The present invention provides a data receiving method for a mobile terminal that can minimize the size (or amount) of data generated in the data transmitting and receiving process, which in turn, can minimize the waste of battery power of the mobile terminal.

The features of the present invention may be implemented in a mobile communications system, such as UMTS. However, the features of the present invention can also be implemented in other types of communication systems that operate under different standards.

It should be noted that the features of the present invention are related to issues regarding the long-term evolution (LTE) of the 3GPP standard. As such, the 3GPP TS 25.813 (LTE TR) and its related sections or portions thereof, as well as various developing enhancements thereof pertain to the present invention. Such enhancements and evolution have resulted in the use of a particular prefix (the letter E) when labeling various network entities (e.g., eNode B), protocol layers, channels, and the like. However, it can be clearly understood that such labeling and other terminology are merely exemplary and thus may be altered (or later clarified) as a result of ongoing or future discussions.

In order to minimize the size (or amount) of data generated in the data transmitting and receiving process, and minimize the waste of battery power, the radio (wireless) network transmits identifier information, which distinguishes whether the data transmitted on a first channel is UE dedicated channel data or common channel data, to a terminal (UE) via a second channel. The terminal receives the second channel in a periodic or non-periodic manner, and if the identifier information received via the second channel indicates that the data is common channel data, the terminal then receives the common channel data via the first channel.

The first channel may be a SCH channel and the second channel may be a SCCH channel that transmits the control information of the SCH channel.

The radio (wireless) network may be an eNode B (eNB), the UE dedicated channel data may be data of a logical channel DTCH or DCCH, and the common channel data may be data of a logical channel CCCH or BCCH, MCCH, MTCH, PCCH and the like.

The identifier information for the common channel data of the SCCH channel may include logical channel type identifier information that identifies the data as being related to a logical channel among a CCCH or BCCH, MCCH, MTCH, PCCH.

The radio (wireless) network may transmit period information corresponding to the logical channel transmitted through the SCH channel or period information corresponding to the SCH channel. The terminal may periodically receive the second channel or the first channel according to the period information received from the radio network.

Figure 6:
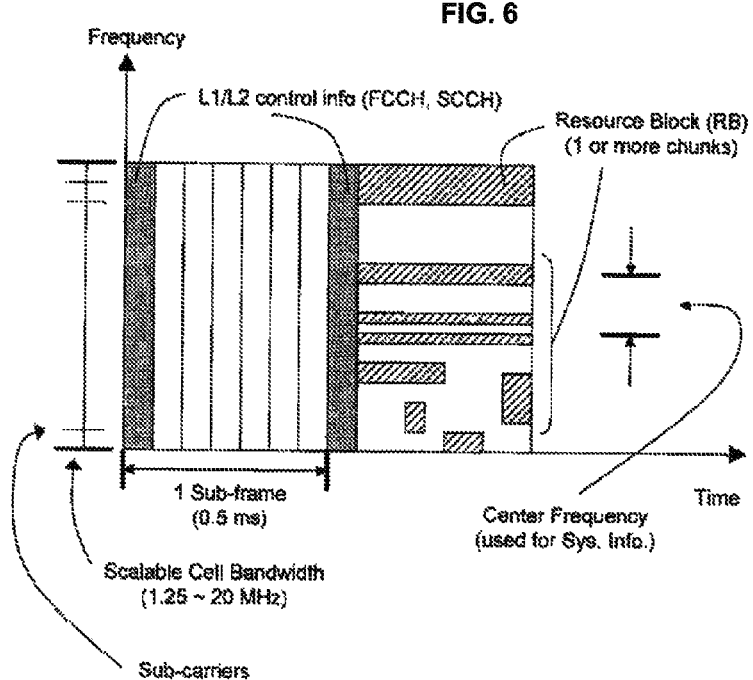
FIG. 6 is a diagram to explain the features of the present invention by showing where the control information and resource blocks may be located within each sub-frame with respect to frequency and time.

FIG. 6 is a diagram to explain the features of the present invention by showing where the control information and resource blocks may be located within each sub-frame with respect to frequency and time.

The structure (format) of a sub-frame in relation to the frequency domain and the time domain can be understood from FIG. 6. Namely, a single sub-frame has a time duration of 0.5 ms with 7 OFDM symbols (portions) therein.

In the first portion of the sub-frame, control information (i.e., L1/L2 control information, FCCH, SCCH, etc.) is included, while resource blocks (RBs) that may be in the form of one or more chunks may be located in the remaining portion of the sub-frame. Here, a resource block may occupy the entire time duration of the sub-frame (excluding the time duration for the control information) or some partial time duration thereof. Also, each resource block (RB) may use a particular frequency range (i.e., a particular number of sub-carriers).

The frequency axis can be referred to as a scalable cell bandwidth, which typically has a frequency range of 1.25~20 MHz. A plurality of sub-carriers exists in the scalable cell bandwidth. Of this frequency range, a so-called center frequency (of approximately 10 MHz) is mainly used in transmitting system information.

In the related art, such system information is considered to be fixed. Although this allows the terminal to easily read the system information, addition of new system information is not possible. In contrast, the present invention allows for at least part of the system information to be flexible (or dynamic).

To do so, the present invention divides (or separates or distinguishes) the system information into primary system information (e.g., Master Information Block: MIB) and non-primary (or secondary) system information (e.g., System Information Block: SIB).

The MIB is transmitted in a static manner (e.g., via a BCH for fixed manner transmission), while the SIB is transmitted in a dynamic manner (e.g., via a downlink SCH for dynamic manner transmission). Here, transmission in a dynamic manner means that different frequency ranges and time durations can be used.

For each frame, the MIB contains information about where each SIB is located. Namely, the particular frequency range and particular time duration for each SIB is specified to allow the terminal (UE) to properly read the appropriate SIBs.

In a similar manner, for each sub-frame within one frame, the control information (located in the first portion) contains information about where each resource block (RB) is located. Namely, the frequency range and particular time duration for each RB is specified to allow the terminal (UE) to properly read the appropriate RBs.

The above concepts generally depicted in FIG. 6 will be explained in more detail in the following description with reference to FIG. 7.

Figure 7:
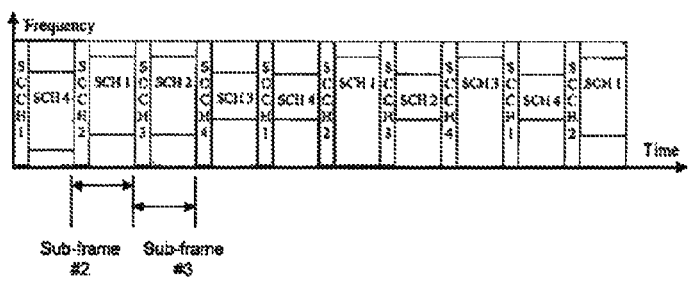
FIG. 7 shows an exemplary embodiment of a data reception method for a mobile communication terminal according to the present invention.

FIG. 7 shows an exemplary embodiment of a data reception method for a mobile communication terminal according to the present invention.

Referring to FIG. 7, each SCCH channel (i.e., control information in the form of SCCH1, SCCH2, SCCH3, SCCH4) may be transmitted using a respectively different frequency and time from that of the SCH, and is transmitted once per each sub-frame. One sub-frame may be 0.5 ms in duration and each SCCH channel is transmitted by using one or two symbols that constitute the corresponding sub-frame. A single sub-frame consists of 6 or 7 symbols, and respectively different symbols constitute respectively different time periods (durations).

Here, it should be noted that multiple SCCH channels may be required for various reasons. For example, different types of traffic may only need to be sent periodically. Also, the limits on the capability of the mobile terminal (UE) may only allow a certain type of data (or information) to be sent in certain periods. As such, the terminal (UE) need not read each and every sub-frame.

In FIG. 7, the SCCH channel (e.g., SCCH1, SCCH2, SCCH3, SCCH4) that is transmitted in a single sub-frame, transmits control information related to a SCH channel (e.g., SCH1, SCH2, SCH3, SCH4) of the corresponding sub-frame. The control information transmitted through one SCCH channel may comprise a mobile terminal identifier (identity), a multicast service identifier (identity), and a logical channel identifier (identity). The logical channel identifier may inform whether the data transmitted in a sub-frame of the corresponding SCH channel is data for a mobile terminal dedicated channel (e.g., DCCH or DTCH) or data for a common channel. In particular, if the data is for a common channel, the logical channel identifier informs about the type of common channel (i.e., BCCH, PCCH, MCCH, MTCH, or CCCH).

The mobile terminal may receive different SCCH channels in a periodic manner, each having a respective period (e.g., every four sub-frames). To do so, the base station (eNode B) transmits period information to the mobile terminal. Then, the mobile terminal may receive the sub-frames of each SCCH channel in a periodic manner according to the period information provided from the base station.

The mobile terminal obtains the logical channel identifier through the received SCCH channel, and by means of the obtained logical channel identifier, the mobile terminal can determine whether the data transmitted via the SCH channel is data for a dedicated channel or data for one of a BCCH, PCCH, MCCH, MTCH or CCCH (i.e., a common channel).

If the logical channel identifier indicates a common channel, the mobile terminal receives the sub-frame of the corresponding SCH channel to thus receive the data of the common channel.

Thus, according to the control of the radio network, the terminal (UE) periodically receives the SCCH1 or one among the SCCH2, SCCH3, and SCCH4. Thus, the eNode B can designate the specific SCCH channel that a particular terminal (UE) should receive.

In FIG. 7, the sub-frame of the SCCH channel and the sub-frame of the SCH channel that is mapped to the sub-frame of the SCCH channel are not the same, and there is a difference of one sub-frame therebetween. Accordingly, for example, for a terminal (UE) that periodically receives the SCCH2 channel, if a UE identifier (mapped to the sub-frame of the SCCH2 channel) is transmitted or if desired (or interested) information is transmitted, then a sub-frame of the SCH2 channel (that is transmitted one sub-frame after the sub-frame of the SCCH2 channel) is received. In other words, referring to FIG. 7, for a UE that periodically receives SCCH2, if the information in SCCH2 of sub-frame #2 indicates that certain information in SCH2 should be read, then the SCH2 of sub-frame #3 is read by that UE.

It should be noted that information in a particular SCCH (i.e., control information) need not refer to only its corresponding sub-frame that is located one subsequent sub-frame thereafter. In other words, the information in a particular SCCH may provide information (i.e. resource block location based on time and frequency characteristics) about a sub-frame to be read at two or more sub-frames later. This may be necessary for various reasons, such as if the size of amount of data to be read is relatively large, when persistent scheduling is performed, or the like.

As a result of the present invention, the radio (wireless) network transmits identifier information, which distinguishes whether the data transmitted on a first channel is UE dedicated channel data or common channel data, to a terminal (UE) via a second channel. The terminal receives the second channel in a periodic or non-periodic manner, and if the identifier information received via the second channel indicates that the data is common channel data, the terminal then receives the common channel data via the first channel. By using such procedures, the size (or amount) of data generated in the data transmitting and receiving process is minimize, and battery power consumption is minimal.

It should be noted that the SCCH may also be described in different terms. Namely, the control information transmitted by the network may be called L1/L2 control information, FCCH, SCCH, or the like.

The present disclosure provides a method of receiving control information by a terminal in a mobile communications system having a single control channel and a plurality of common channels and having a network that periodically transmits the control information via the control channel, the method comprising: periodically receiving the control channel; detecting, at a particular time, an identifier from the received control channel; and receiving data via a particular common channel that is indicated by control information that includes the detected identifier.

Also, the present disclosure provides a method of transmitting control information by a network to a terminal in a mobile communications system having a single control channel and a plurality of common channels, the method comprising: periodically transmitting the control channel; and transmitting data via a particular common channel that is indicated by control information that includes an identifier detected, at a particular time, by the terminal from the control channel.

The identifier may be a terminal identifier for the terminal itself or is a common channel identifier. The at least one of the common channels may be a CCCH, a BCCH, a MCCH, a MTCH or a PCCH. The control information may be received via the control channel. The control information and data may be received (transmitted) in the same sub-frame. The control information and data may be received (transmitted) in different sub-frames. The control information may indicate time and frequency information for the data in the same sub-frame or a different subsequent sub-frame. The control information may comprise at least one of SCCH, FCCH, and L1/L2 control information. The control information may indicate at least one of a frequency parameter, a time parameter, and a size parameter of the data to be read. The frequency parameter may relate to symbols, the time parameter relates to subcarriers, and the size parameter relates to symbols and subcarriers.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting information by a device in a network in a mobile communication system, the method comprising:

transmitting, by the device, control information via a shared control channel via a first portion of a subframe to at least one user equipment, the control information comprising indication information and scheduling information, wherein the indication information indicates that the shared control channel corresponds to a specific logical channel, the specific logical channel being a Broadcast Control Channel (BCCH) or a Paging Control Channel (PCCH), and that a control message will be transmitted via a shared data channel, the control message being a broadcast control message or a paging control message respectively corresponding to the BCCH and the PCCH, and wherein the scheduling information indicates where a resource block (RB) containing the control message is located within a time domain and a frequency domain of the shared data channel; and transmitting, by the device to the at least one user equipment via the shared data channel via a remaining portion of the subframe, the control message based on the indication information and the scheduling information, wherein the first portion of the subframe and the remaining portion of the subframe are contiguous portions, and wherein the indication information comprises a logical channel identifier.

2. The method of claim 1, wherein the indication information is transmitted periodically during a first period.

3. The method of claim 2, wherein the scheduling information is transmitted periodically during a second period after transmitting the indication information.

4. A method of receiving information by a user equipment (UE) in a mobile communication system, the method comprising:

receiving, by the UE, control information via a shared control channel via a first portion of a subframe, the control information comprising indication information and scheduling information, wherein the indication information indicates that the shared control channel corresponds to a specific logical channel, the specific logical channel being a Broadcast Control Channel (BCCH) or a Paging Control Channel (PCCH), and that a control message will be transmitted via a shared data channel, the control message being a broadcast control message or a paging control message respectively corresponding to the BCCH and the PCCH, and wherein the scheduling information indicates where a resource block (RB) containing the control message is located within a time domain and a frequency domain of the shared data channel; and receiving, by the UE via the shared data channel via a remaining portion of the subframe, the control message based on the indication information and the scheduling information, wherein the first portion of the subframe and the remaining portion of the subframe are contiguous portions, and wherein the indication information comprises a logical channel identifier.

5. The method of claim 4, wherein the indication information is received periodically during a first period.

6. The method of claim 5, wherein the scheduling information is received periodically during a second period after receiving the indication information.

7. A base station configured to operate in a wireless network, the base station comprising:

a transmitter configured to:
transmit control information to at least one user equipment via a shared control channel via a first portion of a subframe, the control information comprising indication information and scheduling information, wherein the indication information indicates
that the shared control channel corresponds to a specific logical channel, the specific logical channel being a Broadcast Control Channel (BCCH) or a Paging Control Channel (PCCH), and
that a control message will be transmitted via a shared data channel, the control message being a broadcast control message or a paging control message respectively corresponding to the BCCH and the PCCH, and wherein the scheduling information indicates where a resource block (RB) containing the control message is located within a time domain and a frequency domain of the shared data channel; and transmit, to the at least one user equipment via the shared data channel via a remaining portion of the subframe, the control message based on the indication information and the scheduling information, wherein the first portion of the subframe and the remaining portion of the subframe are contiguous portions, and wherein the first indication information comprises a logical identifier.

8. The base station of claim 7, wherein the transmitter is further configured to transmit the indication information periodically during a first period.

9. The base station of claim 8, wherein the transmitter is further configured to transmit the scheduling information periodically during a second period after transmitting the indication information.

10. A user equipment configured to operate in a wireless network, the user equipment comprising:

a receiver configured to:
receive control information from a base station via a shared control channel via a first portion of a subframe, the control information comprising indication information and scheduling information, wherein the indication information indicates
that the shared control channel corresponds to a specific logical channel, the specific logical channel a Broadcast Control Channel (BCCH) or a Paging Control Channel (PCCH), and
that a control message will be transmitted via a shared data channel, the control message being a broadcast control message or a paging control message respectively corresponding to the BCCH and the PCCH, and wherein the scheduling information indicates where a resource block (RB) containing the control message is located within a time domain and a frequency domain of the shared data channel; and receive, from the base station via the shared data channel via a remaining portion of the subframe, the control message based on the indication information and the scheduling information, wherein the first portion of the subframe and the remaining portion of the subframe are continuous portions, and wherein the indication information comprises a logical channel identifier.

11. The user equipment of claim 10, wherein the receiver is further configured to receive the indication information periodically during a first period.

12. The user equipment of claim 11, wherein the receiver is further configured to receive the scheduling information periodically during a second period after receiving the indication information.

13. The method of claim 1, wherein the control message is a paging information message or a system information message.

14. The method of claim 4, wherein the control message is a paging information message or a system information message.

15. The base station of claim 7, wherein the control message is a paging information message or a system information message.

16. The user equipment of claim 10, wherein the control message is a paging information message or a system information message.

* * * * *